(12) United States Patent
Messinger

(10) Patent No.: US 7,371,451 B2
(45) Date of Patent: May 13, 2008

(54) SANDWICH TYPE CONSTRUCTION STRUCTURAL PANEL HAVING FOAM TUBE CORE

(75) Inventor: Ross Haynes Messinger, Tustin, CA (US)

(73) Assignee: The Boeing Company, Chicago, IL (US)

( * ) Notice: Subject to any disclaimer, the term of this patent is extended or adjusted under 35 U.S.C. 154(b) by 224 days.

(21) Appl. No.: 10/214,349

(22) Filed: Aug. 6, 2002

(65) Prior Publication Data

US 2004/0028887 A1 Feb. 12, 2004

(51) Int. Cl.
*B32B 1/00* (2006.01)
*B32B 3/00* (2006.01)

(52) U.S. Cl. ............ 428/174; 428/178; 428/179; 428/182; 428/184; 428/188; 428/189; 428/316.6; 428/36.91

(58) Field of Classification Search ............ 428/308.4, 428/35.7, 36.91, 54, 72, 76, 77, 178, 188, 428/174, 182, 184, 189, 316.6
See application file for complete search history.

(56) References Cited

U.S. PATENT DOCUMENTS

| | | | |
|---|---|---|---|
| 3,525,663 A | 8/1970 | Hale | |
| 3,663,347 A | 5/1972 | Schoen | |
| 3,876,492 A | 4/1975 | Schott | |
| 4,606,960 A | 8/1986 | Angel et al. | |
| 4,906,508 A | 3/1990 | Blankenburg et al. | |
| 4,952,450 A * | 8/1990 | Noel | 428/174 |
| 5,326,513 A | 7/1994 | Kubbutat | |
| 6,187,401 B1 | 2/2001 | Heisel et al. | |
| 6,808,003 B2 * | 10/2004 | Raghunathan et al. | 164/98 |
| 2003/0173720 A1 * | 9/2003 | Musso et al. | 264/635 |
| 2003/0188792 A1 * | 10/2003 | Donnelly | 138/122 |

FOREIGN PATENT DOCUMENTS

| | | | |
|---|---|---|---|
| EP | 1382403 A1 * | 1/2004 | |
| FR | 2777644 A1 * | 10/1999 | |
| JP | 11023182 A * | 1/1999 | |

* cited by examiner

*Primary Examiner*—Michael Miggins
(74) *Attorney, Agent, or Firm*—Harness, Dickey & Pierce, P.L.C.

(57) ABSTRACT

A structural panel comprised of a plurality of distinct layers of cylindrical foam elements each covered with a fiber-reinforced composite material. The cylindrical foam elements are arranged in layers such that the elements of adjacent layers are arranged non-parallel to one another. A pair of facesheets are secured to opposing surfaces of the cylindrical foam elements. The structural panel is high in strength, structural stiffness, and yet relatively low in weight, and is suitable for a variety of aerospace and other applications.

13 Claims, 4 Drawing Sheets

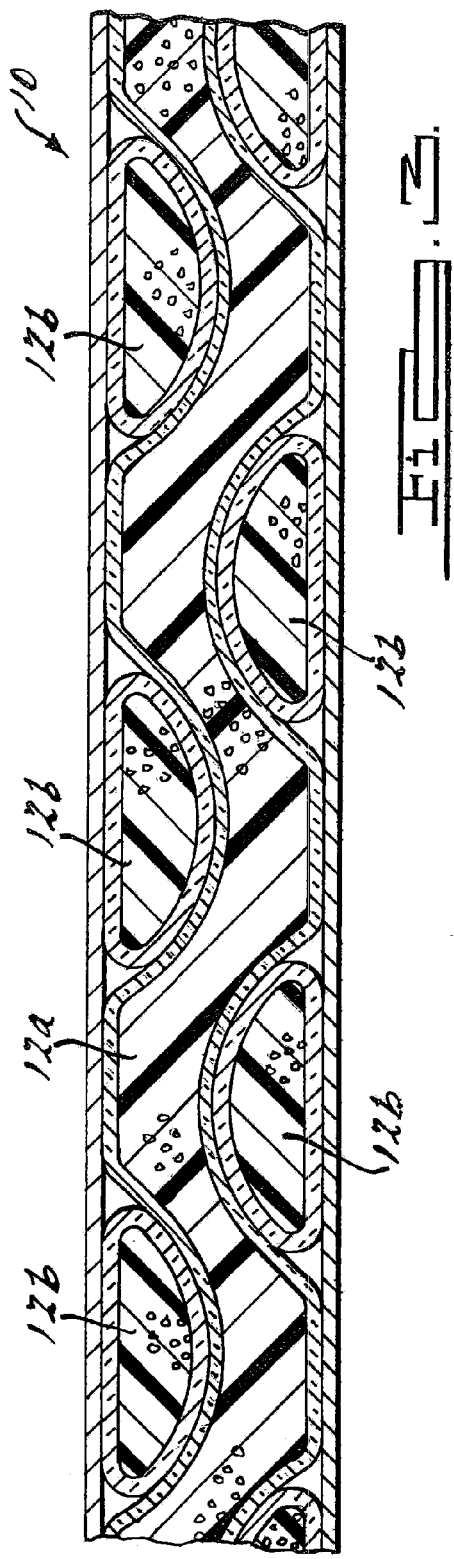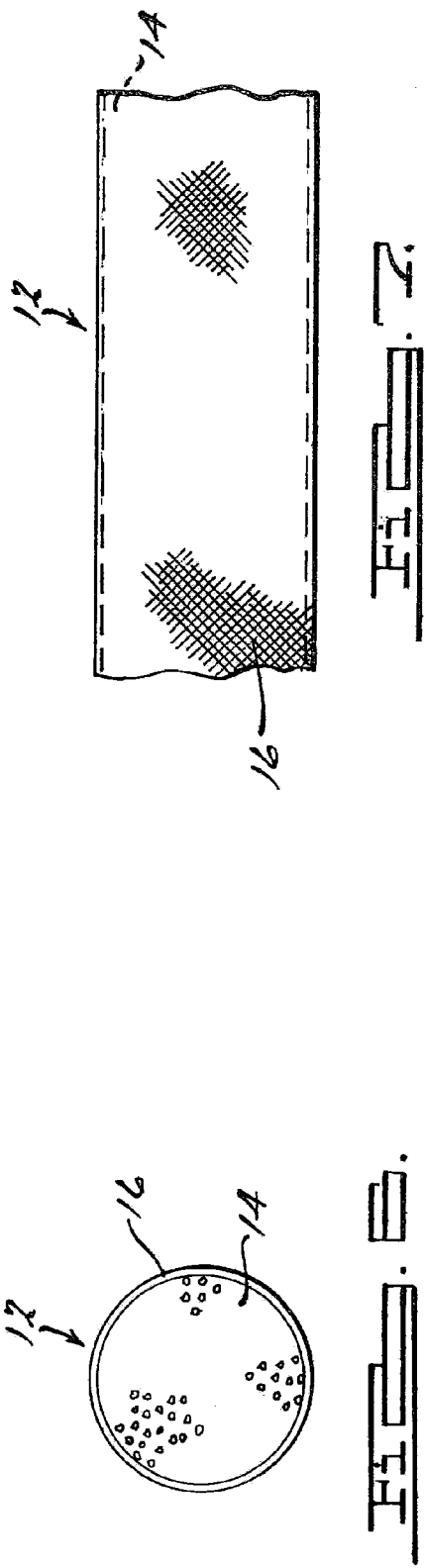

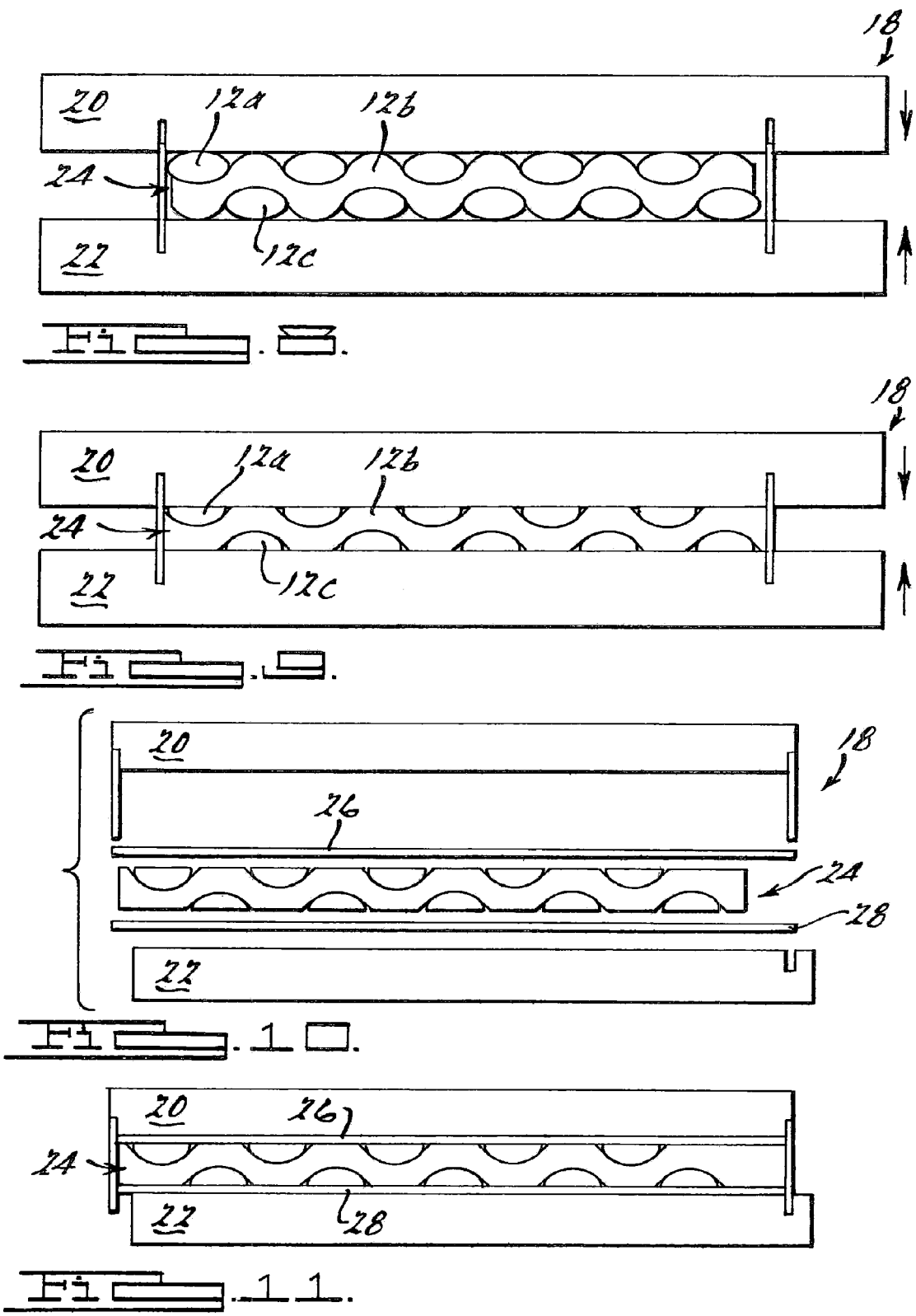

SANDWICH TYPE CONSTRUCTION STRUCTURAL PANEL HAVING FOAM TUBE CORE

FIELD OF THE INVENTION

The present invention relates to structural panels and the construction thereof, and more particularly to a structural panel comprised of a plurality of interlaced foam cylinders sandwiched in-between a pair of facesheets, and a method of manufacturing such a structural panel.

BACKGROUND OF THE INVENTION

Sandwich panel construction for structural panels typically provides high flexural stiffness and strength, and thus is used extensively in the aerospace industry, as well as various other industries. Sandwich panels are typically made with many different facesheet materials, and generally with either a foam or honeycomb core material which is sandwiched between the facesheets. Foam by itself, however, does not have an especially high level of strength and/or stiffness. Honeycomb cores, while being generally stronger than foam, can be subject to water collection. Honeycomb core materials also have other drawbacks related to consistent producibility, the ability to easily inspect such material, as well as other issues. In addition, both foam and honeycomb core types may occasionally suffer from low peel strength such that the facesheets secured to either the foam or honeycomb core tend to prematurely disbond (i.e., separate) from the foam or honeycomb core material.

Relatively low foam core strength and stiffness may be mitigated through the use of higher density foam materials. However, a weight penalty is incurred with this approach. In the aerospace industry, honeycomb core panels must be inspected regularly to identify water ingression. When water ingression is found, repair can be time consuming and costly. Low peel strength may also prevent the use of sandwich panels altogether in certain applications or, alternatively, require that higher weight, stiffened panel designs be employed.

Therefore, there is a need for a structural panel comprised of a sandwich-type construction which is structurally strong, relatively light in weight, that can be easily inspected, easily produced, and does not suffer from the various other drawbacks of traditional foam or honeycomb core structural panels.

SUMMARY OF THE INVENTION

The present invention is directed to a structural panel comprised of a plurality of cylindrical elements arranged in a plurality of adjacent layers. The cylindrical elements are arranged non-parallel to each other and, in one preferred form, are covered with facesheets on opposite sides thereof to form a lightweight, yet rigid, structurally strong sandwich-type panel.

In one preferred form the cylindrical elements are comprised of fiber reinforced foam cylindrical elements. Foam tubes or cylinders are coated with a fiber-reinforced material and then arranged in layers such that the elements of one layer are arranged non-parallel to those of its adjacent layer or layers. Facesheets are then bonded to the opposite surfaces of the cylindrical elements to produce an integrated structural panel. In a preferred form, the cylindrical elements are formed by polymer foam cylinders that are sprayed, braided or wrapped with a relatively thin layer of woven, fiber-reinforced composite material.

The method of the present invention involves placing the assembly of fiber-reinforced tubular elements in a device, such as a press, and using heat along with compression to form a tightly interwoven, integrated structural panel. The facesheets may be bonded to the cylindrical elements either subsequent to the compression and heating of the cylindrical elements, or they may be placed in the device together with the cylindrical elements and bonded in a single step with the cylindrical elements.

The present invention provides a structural panel having a sandwich-type construction which is very high in strength and stiffness, while also being lightweight as compared with many other structural sandwich panel designs.

Further areas of applicability of the present invention will become apparent from the detailed description provided hereinafter. It should be understood that the detailed description and specific examples are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 5 is an end view of the assembly of FIG. 4 taken in accordance with directional line 5-5 in FIG. 4;

FIG. 6 is an enlarged end view of one of the cylindrical foam elements;

FIG. 7 is a side view of the cylindrical foam element of FIG. 6;

FIG. 8 is an end view illustrating the cylindrical foam elements initially being compressed by a heating/compression device;

FIG. 9 shows the cylindrical foam elements fully compressed within the heating/compression device;

FIG. 10 illustrates a pair of composite material facesheets being positioned adjacent opposite surfaces of the subassembly of compressed, cylindrical foam elements;

FIG. 11 illustrates the facesheets of FIG. 10 being compressed via a suitable apparatus to opposite surfaces of the subassembly of cylindrical foam elements.

DETAILED DESCRIPTION OF THE PREFERRED EMBODIMENTS

The following description of the preferred embodiment(s) is merely exemplary in nature and is in no way intended to limit the invention, its application, or uses.

Figure 1:
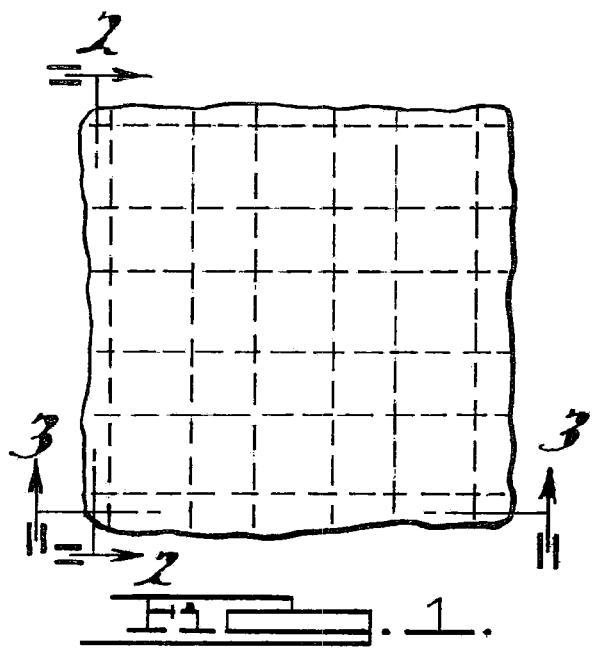
FIG. 1 is a plan view of a structural panel in accordance with a preferred embodiment of the present invention.
Figure 3:
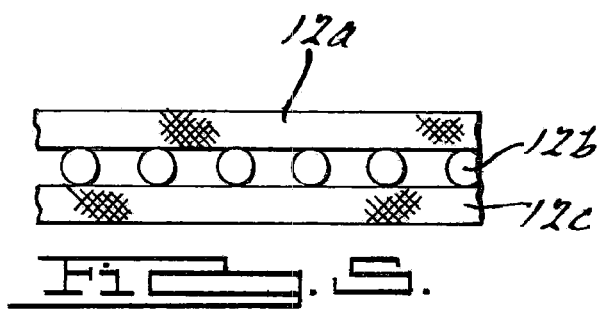
FIG. 3 is an end view of the structural panel of FIG. 1 taken in accordance with directional line 3-3 in FIG. 1.
Figure 2:
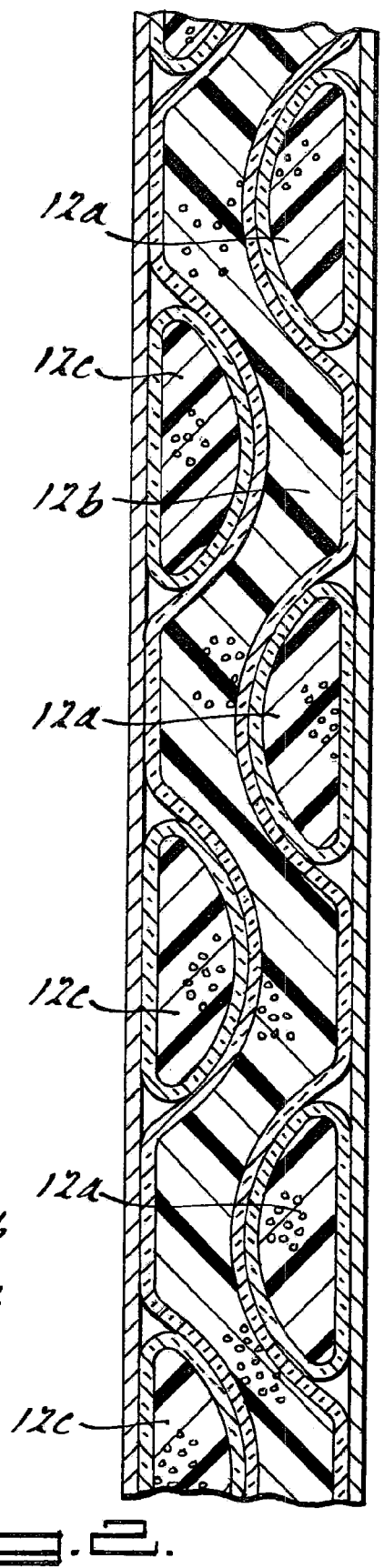
FIG. 2 is an end view of the structural panel taken in accordance with directional line 2-2 in FIG. 1.

Referring to FIGS. 1-3, there is shown a sandwich type, structural panel 10 in accordance with a preferred embodiment of the present invention. The panel 10 generally includes a plurality of elongated foam cylindrical elements 12 which are arranged in a plurality of layers and secured together through a suitable heating/compression process. With specific reference to FIGS. 2 and 3, the foam cylindrical elements 12 are arranged in a plurality of distinct layers. For purposes of discussion, a first layer is comprised of elements 12a, a second layer is comprised of elements 12b and a third layer is comprised of elements 12c. It will be appreciated immediately, however, that a greater or lesser plurality of layers could be formed by the cylindrical elements 12 depending upon the degree of strength and structural rigidity desired for a given structural panel. In one preferred form the cylindrical elements 12a, 12b and 12c are arranged such that the cylindrical elements 12 of adjacent layers are positioned orthogonally to one another, as indicated by dashed lines in FIG. 1. Again, it will be appreciated that a wide variety of other arrangements, such as arrangements forming triangles or other interlocking shapes, could be formed. It is only desired that the cylindrical elements 12a, 12b and 12c be arranged in such a pattern that provides some degree of interlocking or interlaced positioning between the layers when the panel 10 is completely formed.

With brief reference to FIG. 6, in one preferred form, each of the cylindrical elements 12 comprises a foam core 14 which is covered with a fiber-reinforced composite material 16. The fiber-reinforced material 16 may be cured or uncured. The fiber-reinforced composite material 16 may be sprayed, braided or wrapped onto the cylindrical foam core 14. The cylindrical elements, in one preferred form, may comprise polymer foam cylinders fabricated through well known methods, such as by pultrusion. It will be appreciated that the greater the diameter of the foam core 14, and the greater the thickness of the layer of fiber-reinforced composite material 16, the greater the structural rigidity and strength that will be inherent in each cylindrical element 12.

Figure 4:
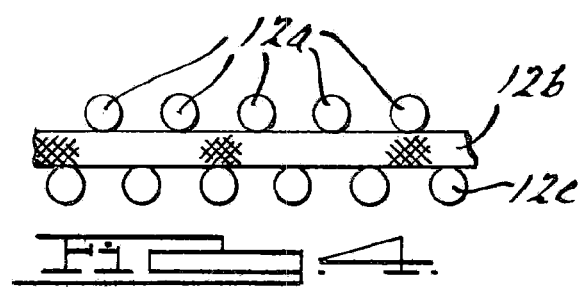
FIG. 4 is an end view of the cylindrical elements of the present invention arranged orthogonally to each other just prior to being placed in a heating/compression apparatus.

Referring now to FIGS. 4-11, the method of constructing the structural panel 10 will be described. As described initially, the cylindrical elements 12 are positioned to form a plurality of layers wherein the elements 13 of one layer are arranged non-parallel to those of its adjacent layer, as indicated in FIG. 4. Collectively, the layers form a subassembly 24. Again, the cylindrical elements 12a, 12b and 12c could be arranged at various other, non-parallel angles to each other and the illustration of these elements arranged at right angles to one another should be understood as being strictly for exemplary purposes. Also, the cylindrical elements 12 of each layer are spaced apart from one an other by a distance preferably approximately the diameter of each element 12. Thus, if each cylindrical element 12 has a diameter of 1.0 inch (2.54 cm), then the spacing between adjacent cylindrical elements 12 would be preferably about 1.0 inch. Again, it will be appreciated that this spacing could be varied to meet the needs of a specific application.

With specific reference to FIG. 8, the subassembly 24 of layers of cylindrical elements 12a, 12b and 12c are placed between a heating/compression device 18, such as a press, having tool portions 20 and 22. The cylindrical elements 12a, 12b and 12c of subassembly 24 are then compressed together while heat is applied thereto. In FIG. 9, the cylindrical elements 12a, 12b and 12c are shown fully compressed by the tool portions 20 and 22 of heating/compression device 18. The subassembly 24 of cylindrical elements 12a, 12b and 12c may be held in this position for a suitable time period such that the cylindrical elements 12a, 12b and 12c are fully bonded to one another. It will also be appreciated that the cylindrical elements 12 may be formed from a foam which is formulated to expand during heating. This would further ensure complete contact between each of the cylindrical elements 12 and a strong interlocking construction.

At FIG. 10, a pair of facesheets 26 and 28 are placed on opposite sides of the subassembly 24. The facesheets 26, 28 are preferably comprised of a composite material and are then placed between the tool portions 20 and 22 of the heating/compression device 18 so that the facesheets 26 and 28 are bonded to the opposing surfaces of the subassembly 24, as shown in FIG. 11. As will be particularly visible in FIGS. 2 and 3, the cylindrical elements 12 each comprise somewhat of a "D" shape (when viewed from one end) after the panel 10 is formed.

The facesheets 26 and 28 may be cured or uncured facesheets. Preferably, the facesheets 26 and 28 are placed on opposing sides of the subassembly 24, as shown in FIGS. 10 and 11, but it will be appreciated that a single facesheet could be placed on one or the other opposite sides of the subassembly 24. Alternatively, a plurality of facesheets could be placed on one or both sides of the subassembly 24.

Figure 12:
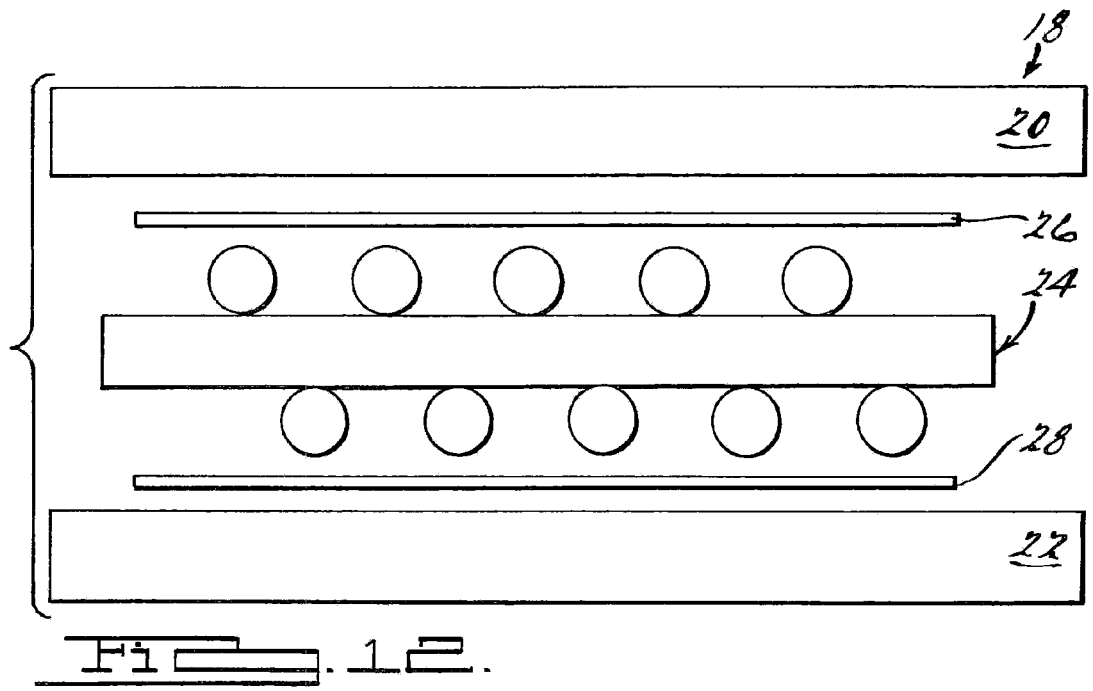
FIGS. 12-14 illustrate an alternative preferred method of forming the structural panel.
Figure 13:
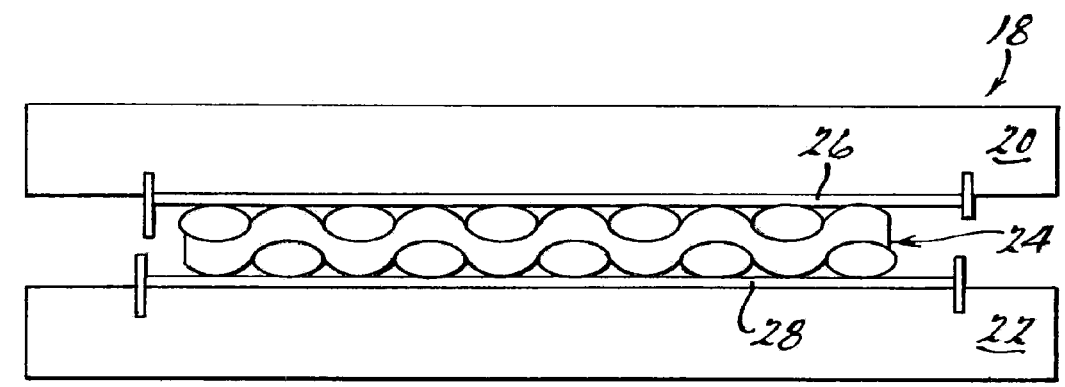
Figure 14:
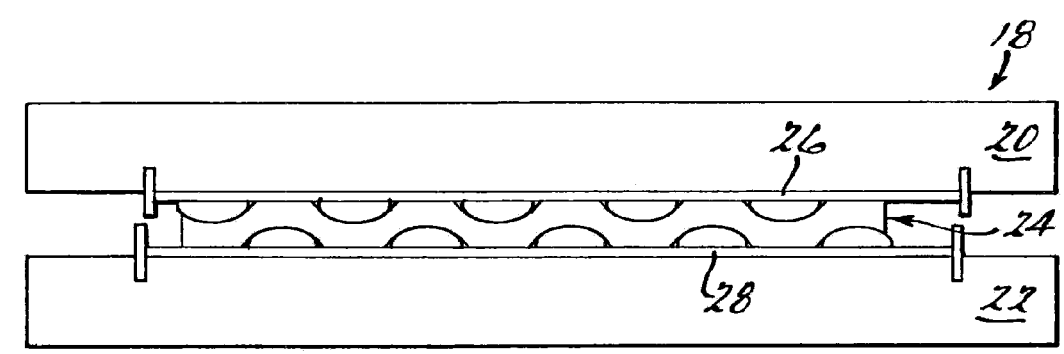

FIGS. 12-14 illustrate an alternative preferred method of forming the panel 10 in which the facesheets 26 and 28 are arranged over opposing surfaces of the subassembly 24 prior to heating and compressing the elements 12a, 12b and 12c, as shown in FIG. 12. The facesheets 26 and 28 are then subjected to compression and heat within the heating/compression device 18 simultaneously with the cylindrical elements 12a, 12b and 12c, as indicated in FIGS. 13 and 14.

It will also be appreciated that a variety of modifications could be made to the panel 10 to suit the needs of a specific application. For example, thermoplastic tubes without any foam could be employed. Thermoplastic foam tubes having a suitably strong plastic skin that fuses together during the forming process could also be employed.

The cylindrical elements 12 could also be formed of different diameters to enable tapered cores to be formed. Such tapered cores would be useful in constructing panels that are to be used for aircraft control surfaces and in other aerospace applications where aerodynamics, structural strength and lightweight panels are needed. Aluminum foam, formed by thermoplastic forming, could also be employed to form the cylindrical elements 12.

The structural panel 10 of the present invention provides the high strength and stiffness in core construction which is highly desirable in sandwich type panel construction. Its lightweight, relative ease of manufacture and relative low cost make it ideal for a wide variety of applications where high flexural strength, lightweight structural panels are needed.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A structural panel comprising:
   a first plurality of cylindrical foam elements, said first plurality of cylindrical elements forming a first layer;
   a second plurality of cylindrical foam elements forming a second layer; and
   said second plurality of cylindrical elements being arranged adjacent to and non-parallel to said first plurality of cylindrical elements, at least one of said first and second plurality of cylindrical elements including a deformable material wherein said first and second plurality of cylindrical elements are squashed into interlocking and interwoven engagement with one another.

2. The panel of claim 1, wherein each of said first plurality of cylindrical elements comprises a foam cylindrical element covered with a fiber-reinforced composite material.

3. The panel of claim 1, wherein each of said second plurality of cylindrical elements comprises a foam cylindrical element covered with a fiber-reinforced composite material.

4. The panel of claim 1, further comprising a facesheet secured to one of said first and second pluralities of cylindrical elements.

5. The panel of claim 1, wherein each of said first and second pluralities of cylindrical elements are spaced apart by predetermined distances and arranged generally orthogonally to each other.

6. The panel of claim 1, wherein one of said first and second pluralities of cylindrical elements comprises thermoplastic tubular elements.

7. A structural panel comprising:
   a first plurality of foam cylindrical elements covered with a layer of fiber-reinforced composite material, said first plurality of foam cylindrical elements forming a first layer;
   a second plurality of foam cylindrical elements covered with a layer of fiber-reinforced composite material, said second plurality of foam cylindrical elements forming a second layer;
   said first and second layers of foam cylindrical elements being arranged adjacent to and generally perpendicular to one another and squashed into interlocking and interwoven engagement with one another to form an interlocking assembly of deformed layers of said foam cylindrical elements, to thereby form said structural panel, and each of said first plurality of foam cylinders being spaced apart from one another to define spaces therebetween, and each of said second plurality of foam cylinders being spaced apart to form spaces therebetween.

8. The panel of claim 7, further comprising at least one facesheet applied over one of said first and second pluralities of foam cylindrical elements.

9. The panel of claim 7, wherein each one of said first plurality of foam cylindrical elements are separated by a predetermined distance.

10. The panel of claim 7, further comprising:
    a first facesheet secured to said first plurality of foam cylindrical elements; and
    a second facesheet secured to said second plurality of foam cylindrical elements.

11. The panel of claim 7, wherein said first and second pluralities of foam cylindrical elements each comprise pluralities of polymer foam elements.

12. The panel of claim 7, wherein one of said first and second pluralities of foam cylindrical elements comprise aluminum foam cylindrical elements.

13. A structural panel comprising:
    a first plurality of cylindrical elements, said first plurality of cylindrical elements forming a first layer;
    a second plurality of cylindrical elements forming a second layer;
    said second plurality of cylindrical elements being arranged adjacent to and non-parallel to said first plurality of cylindrical elements, at least one of said first and second plurality of cylindrical elements including a deformable material wherein said first and second plurality of cylindrical elements are squashed into interlocking and interwoven engagement with one another; and
    each of said cylindrical elements including a foam core covered by a fiber-reinforced composite material.

\* \* \* \* \*